United States Patent
Dubeyko et al.

(10) Patent No.: US 12,292,875 B2
(45) Date of Patent: May 6, 2025

(54) IMPLEMENTATION OF INSTANT CORRUPTION DETECTION AND RECOVERY

(71) Applicants: Lemon Inc., Grand Cayman (KY); Beijing Youzhuju Network Technology Co., Ltd., Beijing (CN)

(72) Inventors: Viacheslav Dubeyko, Los Angeles, CA (US); Jian Wang, Beijing (CN)

(73) Assignees: Lemon Inc., Grand Cayman (KY); Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/130,670

(22) Filed: Apr. 4, 2023

(65) Prior Publication Data
US 2023/0237046 A1     Jul. 27, 2023

(51) Int. Cl.
G06F 7/00          (2006.01)
G06F 16/23        (2019.01)
G06F 16/2455    (2019.01)
G06F 17/00        (2019.01)

(52) U.S. Cl.
CPC .... *G06F 16/2365* (2019.01); *G06F 16/24568* (2019.01)

(58) Field of Classification Search
None
See application file for complete search history.

(56) References Cited

U.S. PATENT DOCUMENTS

| | | | |
|---|---|---|---|
| 2013/0055018 A1* | 2/2013 | Joshi | G06F 11/2082 |
| | | | 714/E11.127 |
| 2017/0322927 A1* | 11/2017 | Dubeyko | G06F 11/006 |
| 2022/0229747 A1* | 7/2022 | Ma | G06F 11/2094 |

* cited by examiner

*Primary Examiner* — Tuan A Pham
(74) *Attorney, Agent, or Firm* — BakerHostetler

(57) ABSTRACT

The present disclosure describes techniques for implementing instant corruption detection and recovery. A plurality of streams may be created in a storage device. Each of the plurality of streams may contain a sequence of metadata nodes of a same type. Each of the plurality of streams may maintain an initial state, a sequence of delta modifications to the initial state, and an actual state for each of the sequence of metadata nodes. A checking and recovery function associated with a particular stream among the plurality of streams may be determined. The checking and recovery function may comprise checking logic configured to detect corruptions by checking modification operations associated with metadata nodes in the particular stream. The checking and recovery function may further comprise recovery logic configured to perform recoveries from the corruptions. The checking and recovery function associated with the particular stream may be implemented in the storage device.

17 Claims, 18 Drawing Sheets

1100

Create a plurality of streams in a storage device, wherein each of the plurality of streams is configured to contain a sequence of metadata nodes of a same type among a plurality of metadata types, and wherein each of the plurality of streams is configured to maintain an initial state, a sequence of delta modifications to the initial state, and an actual state for each of the sequence of metadata nodes 1102

Determine a checking and recovery function associated with a particular stream among the plurality of streams, wherein the checking and recovery function comprises checking logic configured to detect corruptions by checking modification operations associated with metadata nodes in the particular stream, and wherein the checking and recovery function further comprises recovery logic configured to perform recoveries from the corruptions 1104

Offload computation by implementing the checking and recovery function associated with the particular stream in the storage device, wherein the storage device is associated with at least one computational core 1106

1100

Create a plurality of streams in a storage device, wherein each of the plurality of streams is configured to contain a sequence of metadata nodes of a same type among a plurality of metadata types, and wherein each of the plurality of streams is configured to maintain an initial state, a sequence of delta modifications to the initial state, and an actual state for each of the sequence of metadata nodes 1102

Determine a checking and recovery function associated with a particular stream among the plurality of streams, wherein the checking and recovery function comprises checking logic configured to detect corruptions by checking modification operations associated with metadata nodes in the particular stream, and wherein the checking and recovery function further comprises recovery logic configured to perform recoveries from the corruptions 1104

Offload computation by implementing the checking and recovery function associated with the particular stream in the storage device, wherein the storage device is associated with at least one computational core 1106

```
┌─────────────────────────────────────────────────────────────────────────┐
│   Create a plurality of streams in a storage device, wherein each of the plurality of │
│  streams is configured to contain a sequence of metadata nodes of a same type among a │
│                     plurality of metadata types 1202                    │
└─────────────────────────────────────────────────────────────────────────┘
                                      │
                                      ▼
┌─────────────────────────────────────────────────────────────────────────┐
│ Determine a plurality of checking and recovery function associated with the plurality of │
│    streams, wherein each of the plurality of checking and recovery functions corresponds │
│              to a particular stream among the plurality of streams 1204 │
└─────────────────────────────────────────────────────────────────────────┘
                                      │
                                      ▼
┌─────────────────────────────────────────────────────────────────────────┐
│   Determine functions configured to check relations of metadata nodes in two or more │
│      streams, wherein the two or more streams are among the plurality of streams 1206 │
└─────────────────────────────────────────────────────────────────────────┘
                                      │
                                      ▼
┌─────────────────────────────────────────────────────────────────────────┐
│ Maintain consistency of the plurality of metadata types by offloading computation into │
│       the storage device, wherein the storage device is associated with at least one │
│                             computational core 1208                     │
└─────────────────────────────────────────────────────────────────────────┘
```

Manage, by a storage device, a mapping table, wherein the mapping table is configured to associate a stream identifier of a particular stream with a particular range of logical block addresses (LBAs) allocated for the particular stream, wherein the particular stream contains a sequence of metadata nodes of a same type among a plurality of metadata types 1302

Receive, by the storage device, an input/output (I/O) request for updating at least one metadata node in the particular stream, wherein the I/O request comprises the stream identifier of the particular stream and LBAs 1304

Check whether at least a subset of the LBAs in the I/O request is incorrect for the particular stream 1306

In response to identifying an incorrectness of the LBAs in the I/O request, discard the I/O request to prevent a corruption 1308

Detect whether an error exists in the recovered state of the at least one metadata node by the file system driver 1602

In response to detecting that the error exists, fixing the error by the FSCK 1604

FIG. 16

IMPLEMENTATION OF INSTANT CORRUPTION DETECTION AND RECOVERY

BACKGROUND

Companies and/or individuals increasingly need to store a large quantity of data for processing. However, such data may be vulnerable to corruption and/or data loss. Such corruption and/or data loss may negatively impact the ability of the companies and/or individuals to process the data. Improved techniques for instantly detecting data corruption and recovering data that are corrupted are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 11 illustrates an example process for implementing instant corruption detection and recovery in accordance with the present disclosure.

FIG. 12 illustrates another example process for implementing instant corruption detection and recovery in accordance with the present disclosure.

FIG. 13 illustrates another example process for implementing instant corruption detection and recovery in accordance with the present disclosure.

FIG. 16 illustrates another example process for implementing instant corruption detection and recovery in accordance with the present disclosure.

DETAILED DESCRIPTION OF ILLUSTRATIVE EMBODIMENTS

Nowadays, digital data become a crucial part of everyday life. Data need to be accessed without delay or data loss. However, there exist multiple sources of potential data loss and/or data corruption. Persistent memory media may cause data corruption as the persistent memory media ages and/or as the physical properties of the persistent memory media degrade. Storage device controllers, firmware algorithms, and/or dynamic random-access memory (DRAM) issues may cause metadata or data corruption. Bugs in the block layer and/or file system algorithms may cause data loss or corruption. Sudden power-offs, unexpected interruptions of application activity, user mistakes, and/or malicious code behavior may cause metadata or data corruption and/or loss. While data storage technologies are mature and robust, they often involve multiple hardware and software layers. The complex interaction between all these layers may cause frequent metadata or data corruption.

Special tools may be needed to manage or resolve the corruption or loss of metadata and user data. File system consistency check (FSCK) utility is one of the main tools that may be used to recover a corrupted file system volume. If a file system driver is not able to mount a file system volume and/or if a failure took place during the file system driver operations, the FSCK tool may be used to recover a consistent state of metadata.

Figure 1:
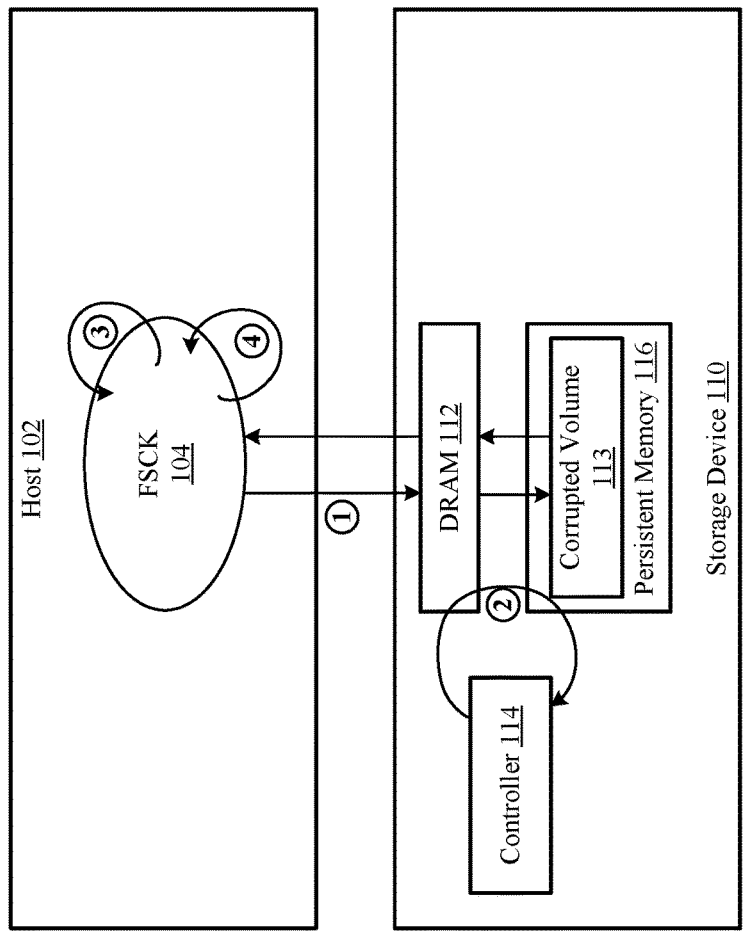
FIG. 1 illustrates an exemplary system for recovering a consistent state of metadata in accordance with the present disclosure.

FIG. 1 shows a system 100 for recovering a consistent state of metadata using a FSCK tool. A host 102 may comprise a FSCK (e.g., FSCK tool) 104. The FSCK 104 may be configured to recover a consistent state of metadata. The FSCK 104 may be configured to recover a consistent state of metadata if a file system volume 113 in a persistent memory 116 of the storage device 110 is corrupted. As described above, the persistent memory 116 may cause the corruption as the persistent memory 116 ages and/or as the physical properties of the persistent memory 116 degrade. The storage device controller 114, firmware algorithms, and/or issues with the DRAM 112 may cause the corruption. Bugs in the block layer and/or file system algorithms may cause the corruption. Sudden power-offs, unexpected interruptions of application activity, user mistakes, and/or malicious code behavior may also cause the corruption.

At numeral 1, a request may be read from the FSCK 104 by the storage device 110. At numeral 2, metadata may be read from persistent memory 116 into the DRAM 112 by the controller 114 on the storage device side. Then, the storage device 110 may send requested metadata into DRAM on the host side. The DRAM on the host side may be configured to store a state of the metadata. The FSCK 104 may access or check the metadata state in the DRAM on the host side. At numeral 3, the FSCK 104 may attempt to recover the consistent state of corrupted metadata in the DRAM on the host side. At numeral 4, the FSCK 104 may write corrected metadata back into the DRAM on the host side. The corrected metadata may be sent to the storage device 110 as write requests. The write requests may be stored into the DRAM 112 on the storage device side. Finally, the controller 114 of the storage device 110 may store the corrected metadata into the persistent memory 116 of the storage device 110.

However, in some situations, it may be impossible to recover and restore metadata and user data. Some complex corruptions may result in failure of the FSCK 104. Silent corruptions may happen long before the corruption is discovered, thus causing a complex chain of metadata corruptions. As file system volumes become bigger, the capacity of the DRAM on the host side may not enough to store all metadata in the DRAM on the host side. To recover the consistent state of corrupted metadata, the FSCK 104 may require that the file system volume is in offline state. As the recovery may take hours or even days, user data may be unavailable, and services may be offline for a long time. Thus, improved techniques for quickly resolving corruption without interrupting or disabling data services for long periods of time are desired.

Described herein are improved techniques for instantly resolving corruption. A storage device may need to provide additional services to guarantee consistency and fast recovery of corrupted metadata and user data without delay or complete shutdown of services. The storage device may need to distinguish metadata input/output (I/O) requests from user data I/O requests.

Figure 2:
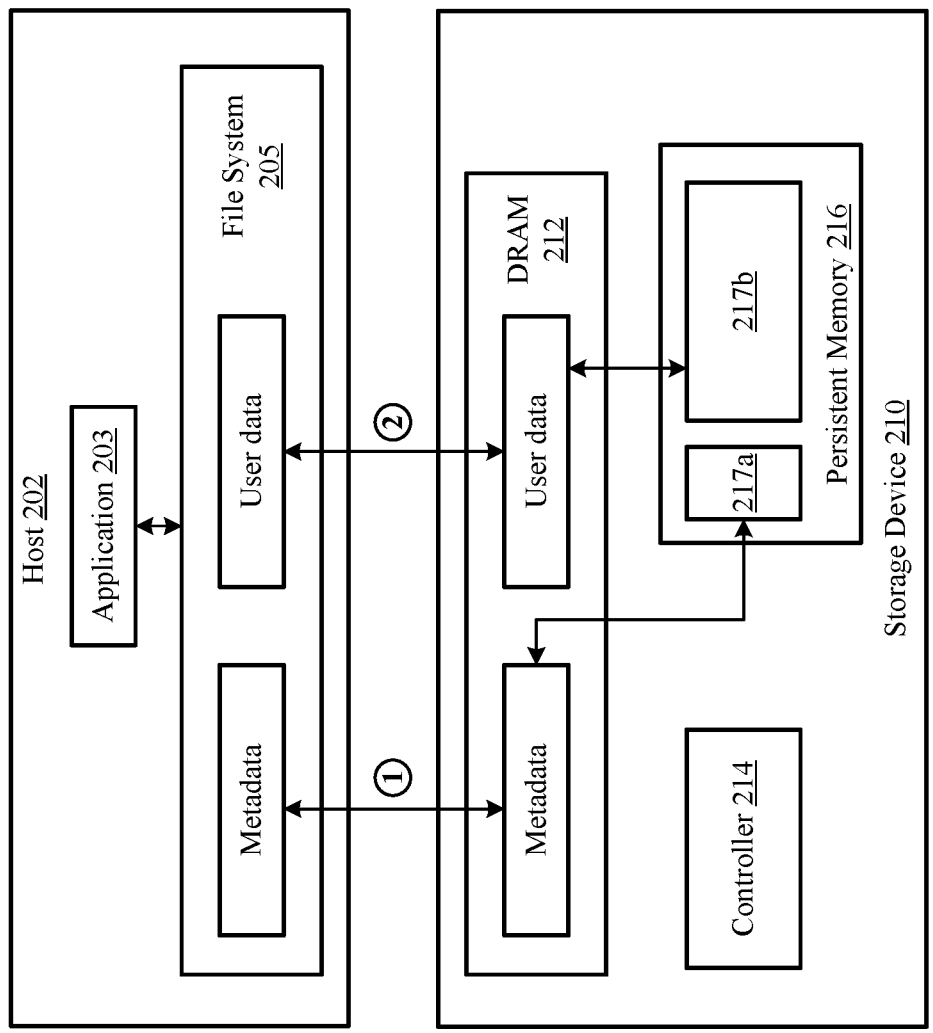
FIG. 2 illustrates an exemplary system for distinguishing metadata I/O requests from user data I/O requests in accordance with the present disclosure.

FIG. 2 shows a system 200 for distinguishing metadata I/O requests from user data I/O requests. The system 200 may comprise a host 202 and a storage device 210. The host 202 may comprise an application 203 and a file system driver 205. OS kernels, such as Linux kernel, may be configured to add a special flag into I/O requests that marks each request as either a metadata I/O request or a user data I/O request. An OS kernel may add a flag to the metadata I/O request to indicate that the metadata I/O request is a metadata I/O request and not a user data I/O request. Similarly, an OS kernel may add a flag to the user data I/O request to indicate that the user data I/O request is a user data I/O request and not a metadata I/O request.

The storage device 210 may analyze the flags to determine whether a particular I/O request is a metadata I/O request or a user data I/O request. The storage device 210 may analyze the flag associated with the metadata I/O request to determine that the metadata I/O request is a metadata I/O request and not a user data I/O request. The storage device 210 may analyze the flag associated with the user data I/O request to determine that the user data I/O request is a user data I/O request and not a metadata I/O request.

Metadata may be more critical information that needs to be specially protected and managed. Thus, the storage device 210 may need to provide a special mechanism for early detection of metadata corruption and an easy way for fast recovery of metadata. Being able to distinguish the metadata I/O request from the user data I/O request allows the storage device 210 to store metadata in one or more special areas 217a of persistent memory 216 and to store user data in one or more special areas 217b of the persistent memory 216. The storage device 210 (e.g., the controller 214 of the storage device 210) may be able to use one or more special redundancy techniques to detect corruption of and recover a consistent state of the metadata and/or user data.

Figure 3:
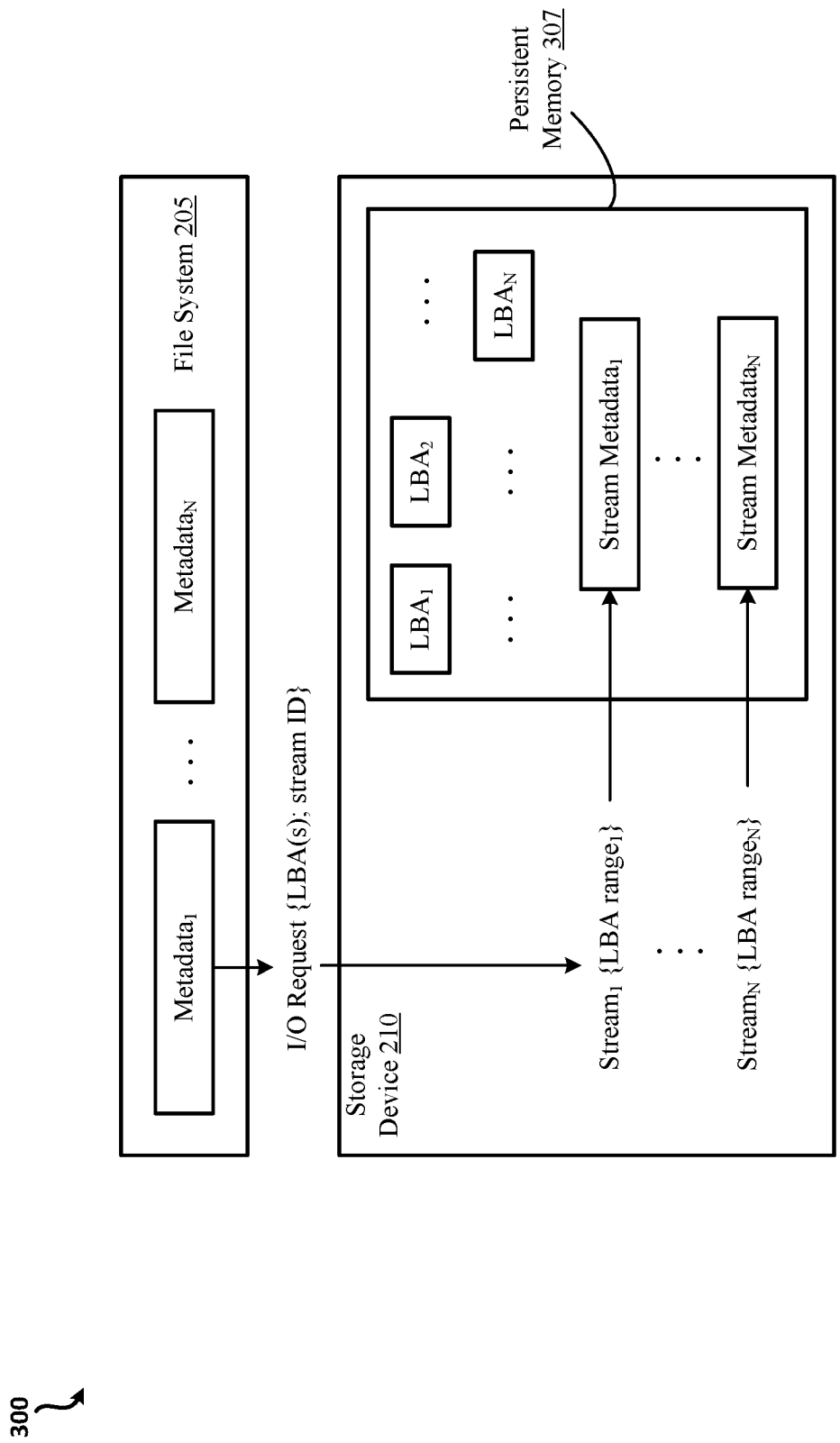
FIG. 3 illustrates an exemplary system for differentiation of metadata types in accordance with the present disclosure.

In embodiments, the file system may comprise multiple types of metadata. FIG. 3 shows a system 300 for differentiation of different metadata types. Each metadata type may require a specialized method for corruption detection and/or a specialized recovery logic. Thus, different metadata types may need to be stored in different areas of the persistent memory 307 of the storage device 210. Streams may be used to store the different metadata types in different areas of the persistent memory 307 of the storage device 210. Each I/O request may contain information about logical block addresses (LBAs) (e.g., a LBA range) that need to be read or written. As described above, a special flag may be used to differentiate the metadata I/O requests from the user data I/O requests. Each I/O request may further comprise an identifier for identifying a stream (i.e., stream ID).

Different types of metadata may be stored into different streams based on the stream IDs identified in the metadata I/O requests. A file system creation tool or/and a file system driver may create or allocate empty streams on the storage device 210 side. The empty streams may be configured to store or add metadata. Each empty stream may receive only add or store operation(s). The empty streams may be created in either a restricted mode or a relaxed mode. In the restricted mode, the empty streams may be created or allocated by special operation before adding any metadata into the stream. If the storage device 210 receives an I/O request with an unknown stream ID, then the request may be discarded by the storage device 210 in the restricted mode. In the relaxed mode, if the storage device 210 receives an I/O request with an unknown stream ID, then the storage device 210 may create or allocate a new stream and store the stream ID into a knowledge base.

Each stream may be associated with a particular LBA range. Each stream may be associated with a particular LBA range using either a flexible model or a fixed range model. If a stream is associated with an LBA range using the flexible model, an I/O request may identify which LBAs should be added into the stream. The storage device 210 may store a mapping table that associates LBAs with stream IDs. It may not be possible to check whether the requested LBA for a particular stream ID is valid or not. If a stream is associated with an LBA range using the fixed range model, the storage device 210 may support the operation of LBA range reservation for a particular stream ID. It may be checked whether the requested LBA for a particular stream ID is valid or not.

Each I/O request may contain a stream ID, an offset, and a number of LBAs to identify the metadata area for modification or access. Alternatively, each I/O request may contain a LBA range and a stream ID to identify the metadata area for modification or access. If a stream is associated with an LBA range using the fixed range model and it is determined that an I/O request contains a LBA range and a stream ID, the storage device 210 may check the correctness of the I/O request and discard a request that contains incorrect LBA numbers for a particular stream ID. This check performed by the storage device 210 may detect and prevent corruption in the early stages of corruption. Thus, the use of streams may facilitate the management of different metadata types by a specialized checking and recovering logic. The storage device 210 may support the stream concept by managing special mapping table that associates stream IDs with particular LBAs.

Figure 4:
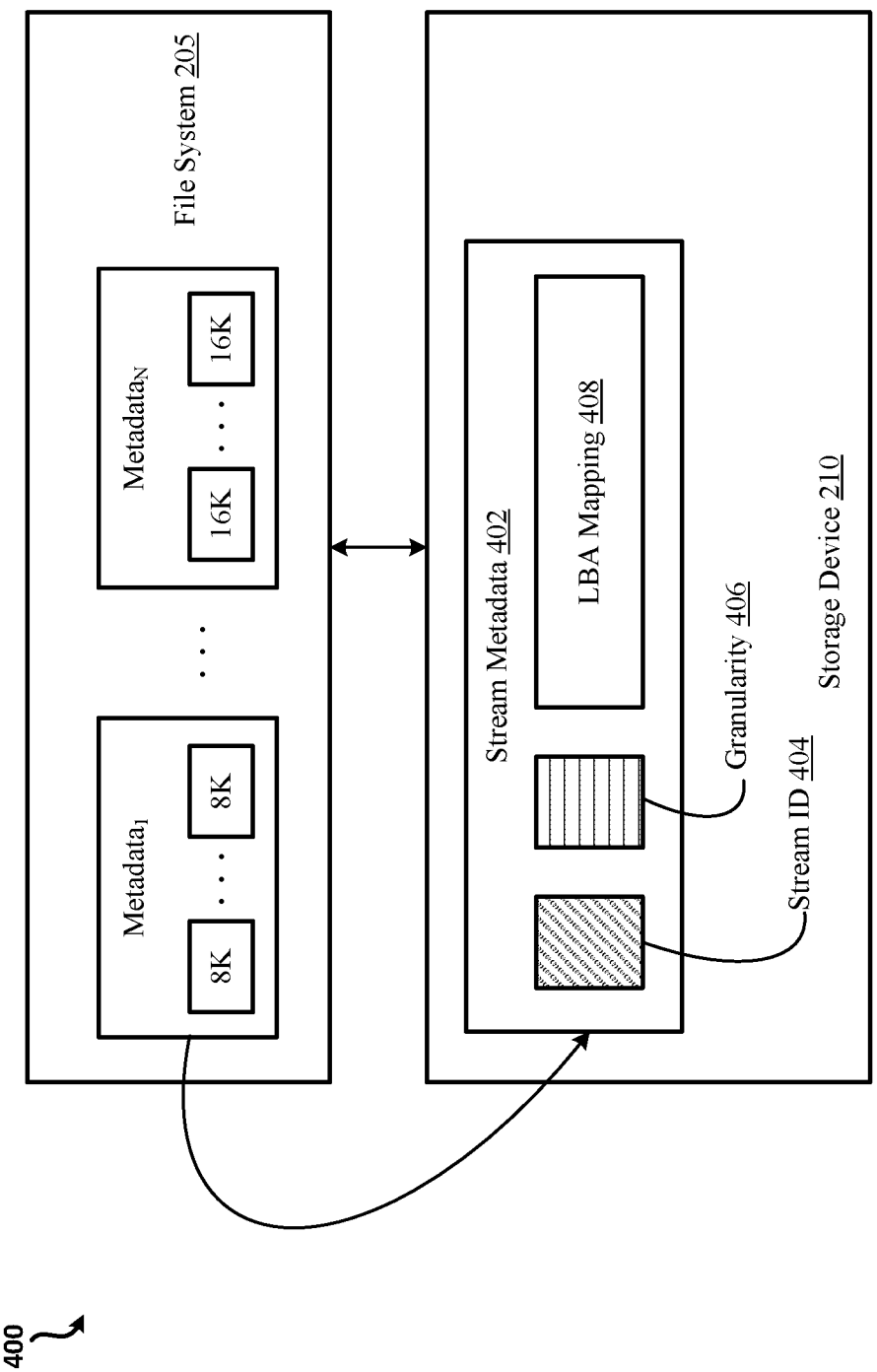
FIG. 4 illustrates an exemplary system for storing stream metadata in accordance with the present disclosure.

FIG. 4 shows a system 400 for storing stream metadata. Each metadata structure may be stored in a dedicated stream. For example, as shown in FIG. 4, the metadata structure labeled Metadata$_1$ may be stored in a stream in the storage device 210. Each metadata structure may be associated with a granularity. The granularity may be, for example, 8 KB, 16 KB, or any other granularity. The granularity may define the typical size of a metadata portion that can be added, modified, and/or deleted to or from the metadata structure by a file system operation. For example, a b-tree may be represented as a set or sequence of 8 KB nodes, or a bitmap may be split into 4 KB portions. The granularity 406 of the metadata 402 associated with the stream may be defined by a file system driver or tool during stream creation. Additionally, or alternatively, an I/O request may define the granularity 406 associated with the stream under creation or the update operation. The storage device 210 may allocate the stream ID 404 and manage the LBA mapping table 402 for the stream.

The stream metadata 402 may indicate a granularity 406 of the metadata structure. The stream metadata 402 may indicate a stream ID 404 of the stream. The stream metadata 402 may indicate an LBA mapping 408 associated with the stream. Persistent memory space in the storage device 210 may be allocated based on the granularity 406 comprised in the stream metadata 402. A file system driver may use its knowledge of the granularity to account or modify a metadata structure. Thus, if the file system driver needs to update an item associated with a particular metadata structure, then the whole node or memory page(s) may be marked as dirty, and may need to be flushed or written into the storage device 210. The granularity 406 may be used to check correctness and/or to recover a particular metadata structure.

Figure 5:
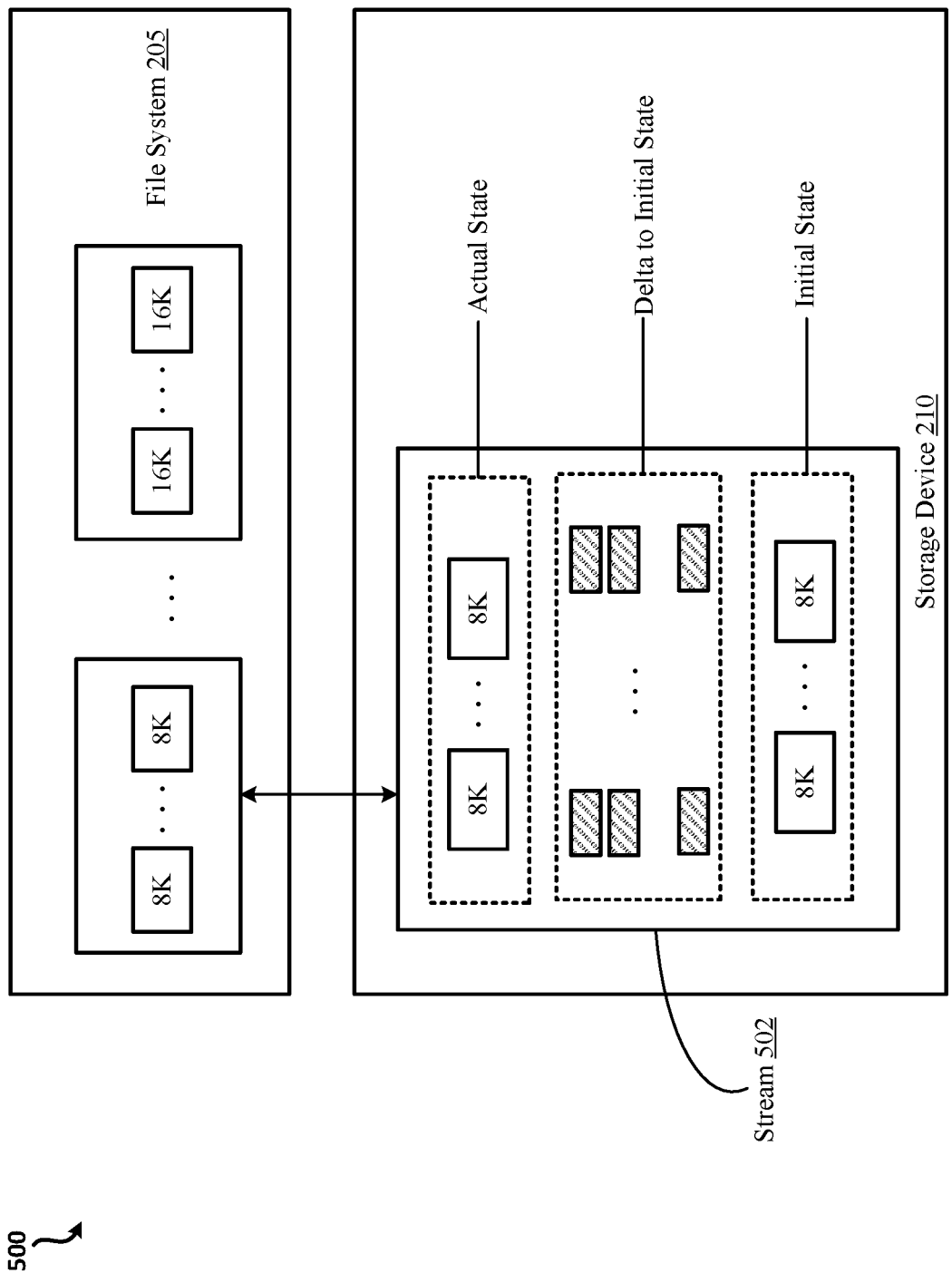
FIG. 5 illustrates an exemplary system for rollback to a previous consistent state of metadata in accordance with the present disclosure.

The recovery of the consistent state of metadata cannot be guaranteed for all possible corruptions. If the recovery of the consistent state of metadata is not possible, it may be necessary to rollback to a previous consistent state of the metadata. FIG. 5 shows a system 500 for recovery of metadata or rollback to a previous consistent state of the metadata. The storage device 210 may store a stream 502 associated with a metadata structure. The stream 502 may have a special architecture that may be used to recover the consistent state of metadata and to rollback to a previous consistent state. The stream 502 may contain a sequence of nodes or portions of particular granularity (e.g., 8 KB).

A file system driver may update the metadata on the basis of defined granularity. The granularity may be 8K, 16K, or any other granularity. The metadata may be partially updated (4K, for example), then the file system driver may send an update only for the 4K portion of the whole granularity. The LBA address may identify which portion of 8K or 16K needs to be updated in persistent memory/media. As a result, the stream 502 may store an initial state of the metadata, a sequence of delta modifications to the initial state of the metadata, and an actual state for every metadata node (for example, 8 KB in size). The initial state area of the stream 502 may store a consistent metadata state associated with a particular timepoint in the past. The delta area of the stream 502 may store delta-encoded states of the metadata node for some number of timepoints in the past. The actual state area of the stream 502 may store the latest state of the metadata node. If the actual state becomes corrupted, then the delta area and the initial state area may be used to recover the latest consistent state of the metadata or rollback to a previous consistent state if the metadata cannot be recovered.

Figure 6:
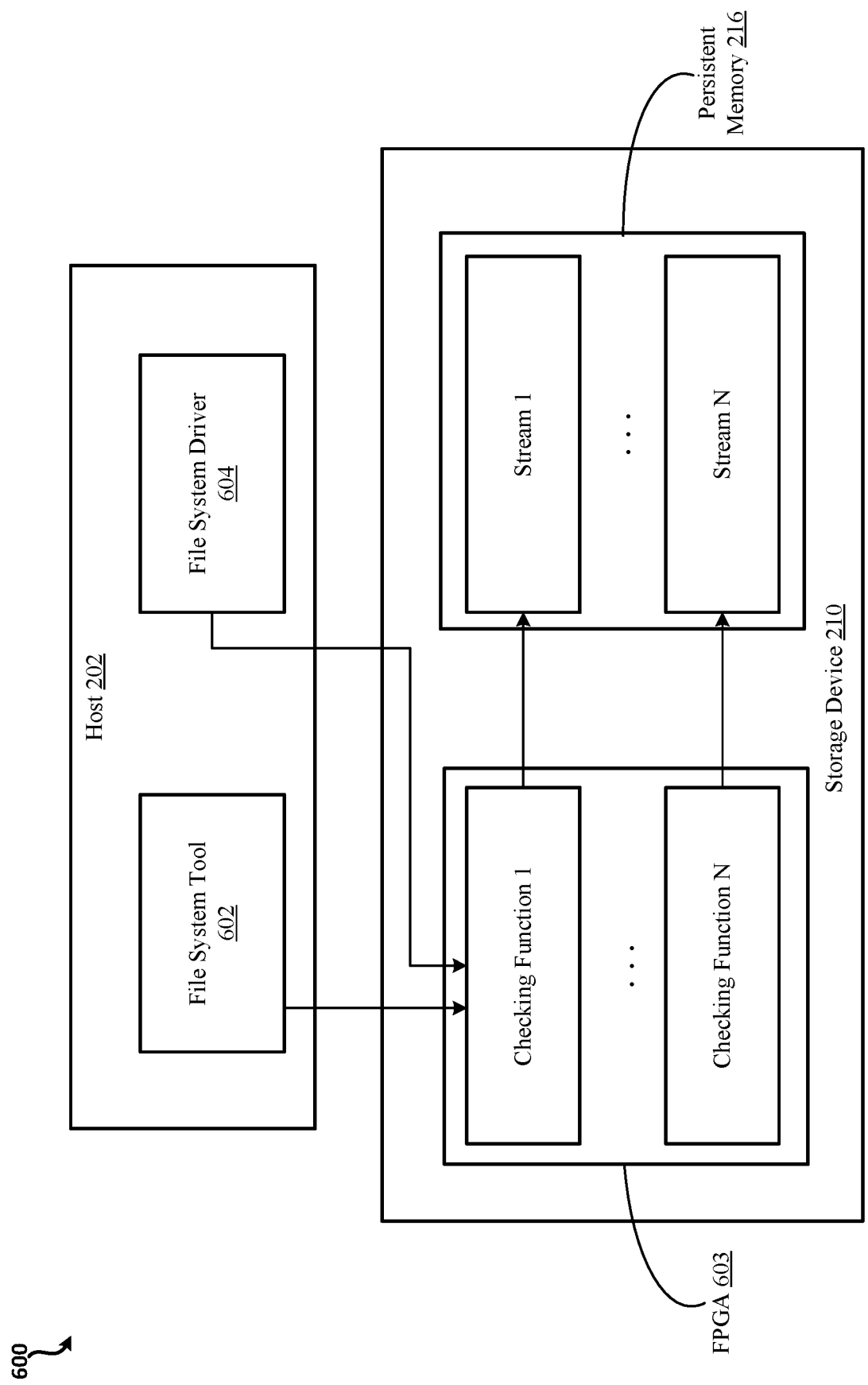
FIG. 6 illustrates an exemplary system for detecting corruption by the storage device 210 in accordance with the present disclosure.

The storage device 210 may be configured to instantly detect corruption. FIG. 6 shows an example system 600 for instantly detecting corruption by the storage device 210. It is important to detect corruption quickly (e.g., right at the moment of the corruption event). To detect corruption quickly, the storage device 210 may check every metadata modification operation. To check every metadata modification operation, the storage device 210 may register a checking logic or function that may be used to check a modification operation of a particular metadata structure. Each checking logic or function (e.g., Checking Function$_1$ . . . Checking Function$_N$) may be used to check a modification operation of a particular stream stored in the persistent memory 216. For example, the checking Function$_1$ may be used to check the modification operation of stream$_1$, etc.

The host 202 may comprise a file system tool 602 and/or a file system driver 604. The file system tool 602 and/or the file system driver 604 may register the checking function(s) for every metadata structure. Thus, an application or kernel driver may store into the storage device 210 a checking and recovery logic associated with a particular data stream. In other embodiments, a public key authentication protocol may be used for registering the checking and recovery logic. The public key authentication protocol may limit access for registering the checking/recovery logic. This logic may be implemented by a FPGA core 603. Alternatively, the logic may be regular executable code that is configured to be executed by a general-purpose ARM or RISC-V core. Alternatively, the logic may be an eBPF function. The storage device 210 may execute checking logic for one or more modification operations. The checking of every operation may be expensive from a performance point of view. Thus, a user may specify whether every I/O operation should be checked, or whether some subset of modification operations should be checked. The checking operation may occur when the storage device is idle, for example. The storage device 210 may be manufactured with the support of some checking primitives that may be used by an application with the goal to associate the checking logic with a particular metadata stream.

Figure 7:
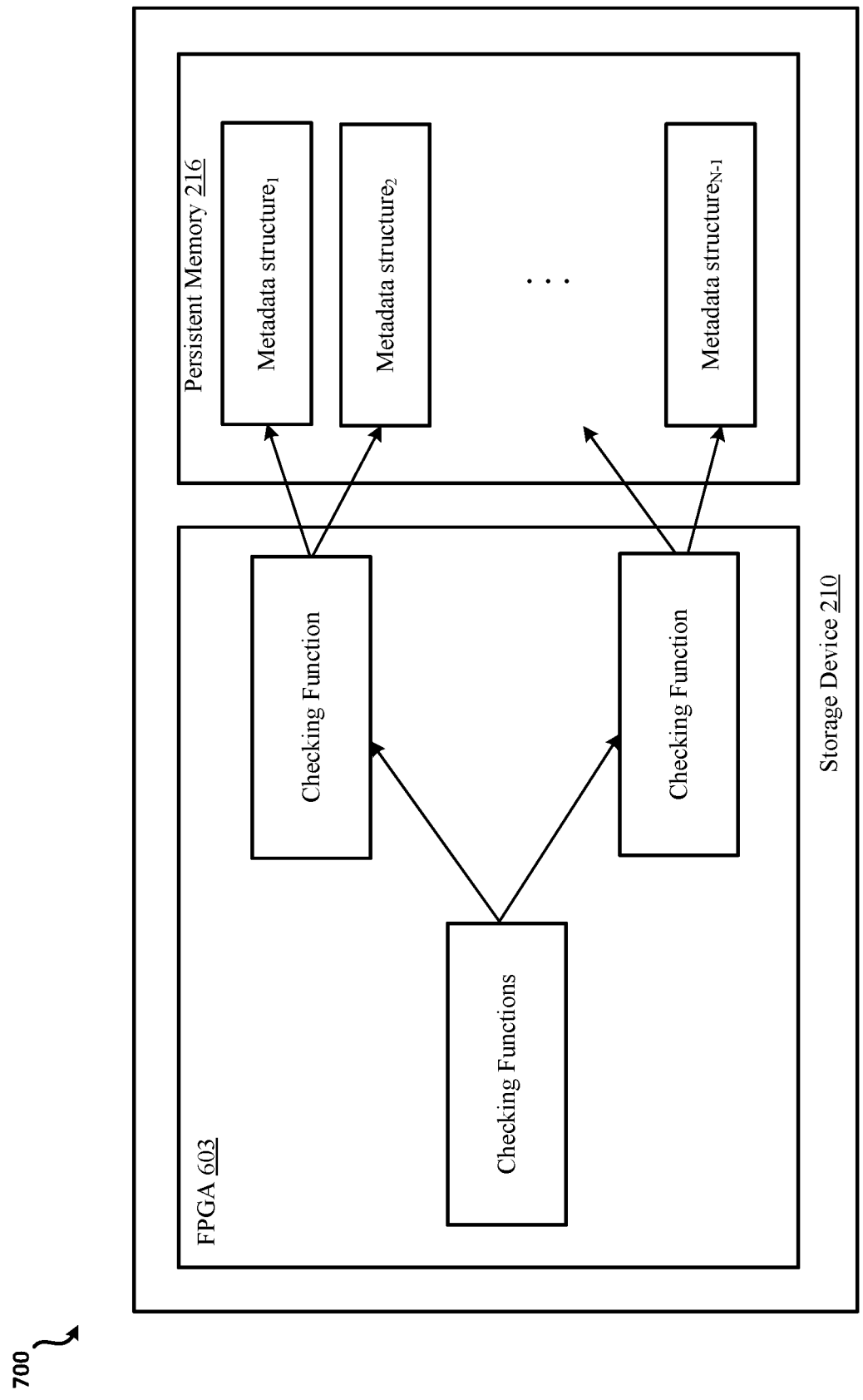
FIG. 7 illustrates an exemplary system for checking the consistency of an entire file system in accordance with the present disclosure.

In embodiments, the storage device 210 may need not only to check the metadata structure independently, but also to check the consistency of all metadata structures as a whole. FIG. 7 shows a system 700 for checking the consistency of an entire file system. Different metadata structures may depend on each other or have relations with each other. Thus, corruption may cause issues with multiple metadata structures. An application or file system driver may define or register not only the functions for checking a particular metadata structure, but also the checking functions that are configured to check relations of metadata items among two or more metadata structures. As shown in FIG. 7, the storage device 210 may first execute the checking function of a particular metadata structure. The storage device 210 may then execute all checking functions for associated metadata structures in the persistent memory 216. The execution of the sequence of checking functions may allow the storage device 210 to check and guarantee the consistency of the file system metadata as a whole.

Figure 8:
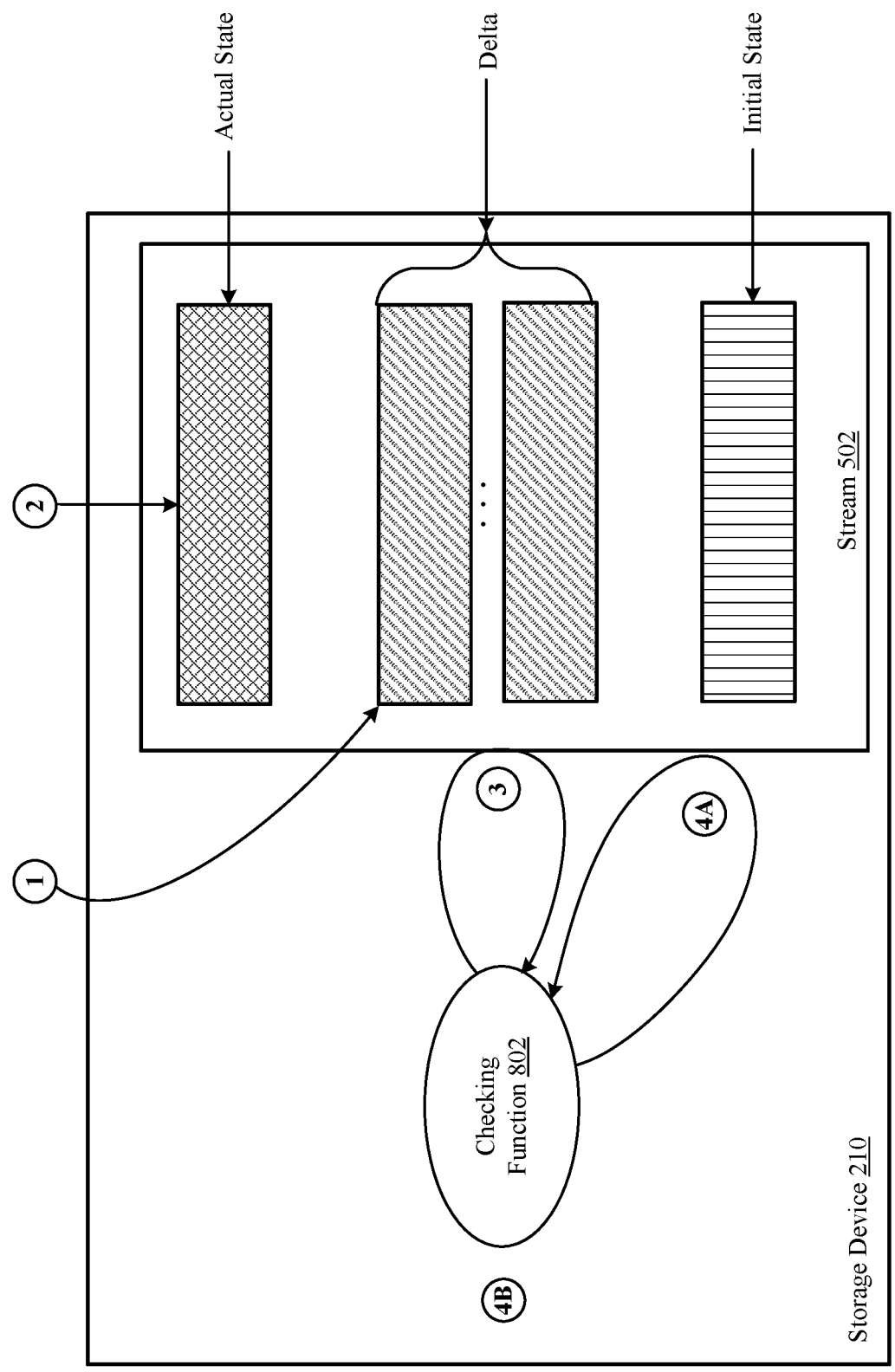
FIG. 8 illustrates an exemplary system for triggering of the checking logic in accordance with the present disclosure.

FIG. 8 shows a system 800 for triggering of the checking logic. The file system driver may store a copy of metadata (e.g., only a portion of the whole metadata) in volatile memory (e.g., DRAM) on the host side. Thus, initially, any metadata (and user data) modifications may happen in DRAM on the host side. The file system driver may track all dirty memory pages and prepare to flush, write, or update I/O request(s) to synchronize metadata states in the DRAM and the persistent memory.

The storage device 210 may receive I/O requests modifying the nodes of the metadata structure during flush operation(s). The storage device 210 may identify metadata node(s) for every I/O request. At numeral 1, the storage device 210 may prepare a delta between the updated and the initial state of the metadata using any suitable delta-encoding technique. The prepared delta may be stored into the delta area of the stream 502. At numeral 2, the storage device 210 may update the actual state of the metadata node. The metadata node may be checked before the actual state is updated. Alternatively, the metadata node may be checked after the actual state is updated. The end of the operation that updates the actual state may trigger execution of the checking function 802 associated with the stream 502. At numeral 3, the consistency of the updated metadata node may be checked based on executing the checking function 802. The checking function 802 may execute after update to the actual state of the metadata node. The checking of every update may be expensive from a performance point of view. Thus, a user may specify whether every update should be checked, or whether a subset of update operations should be checked. If no corruption is detected, then, at numeral 4A, the metadata node may be continued to be used. The delta area may be managed by decreasing the number of stored deltas. Otherwise, if corruption is detected, at numeral 4B, the storage device 210 may convert the metadata node into a read-only state. The storage device 210 may rollback the metadata node in the read-only state to a previous valid state and start the recovery logic.

Figure 9:
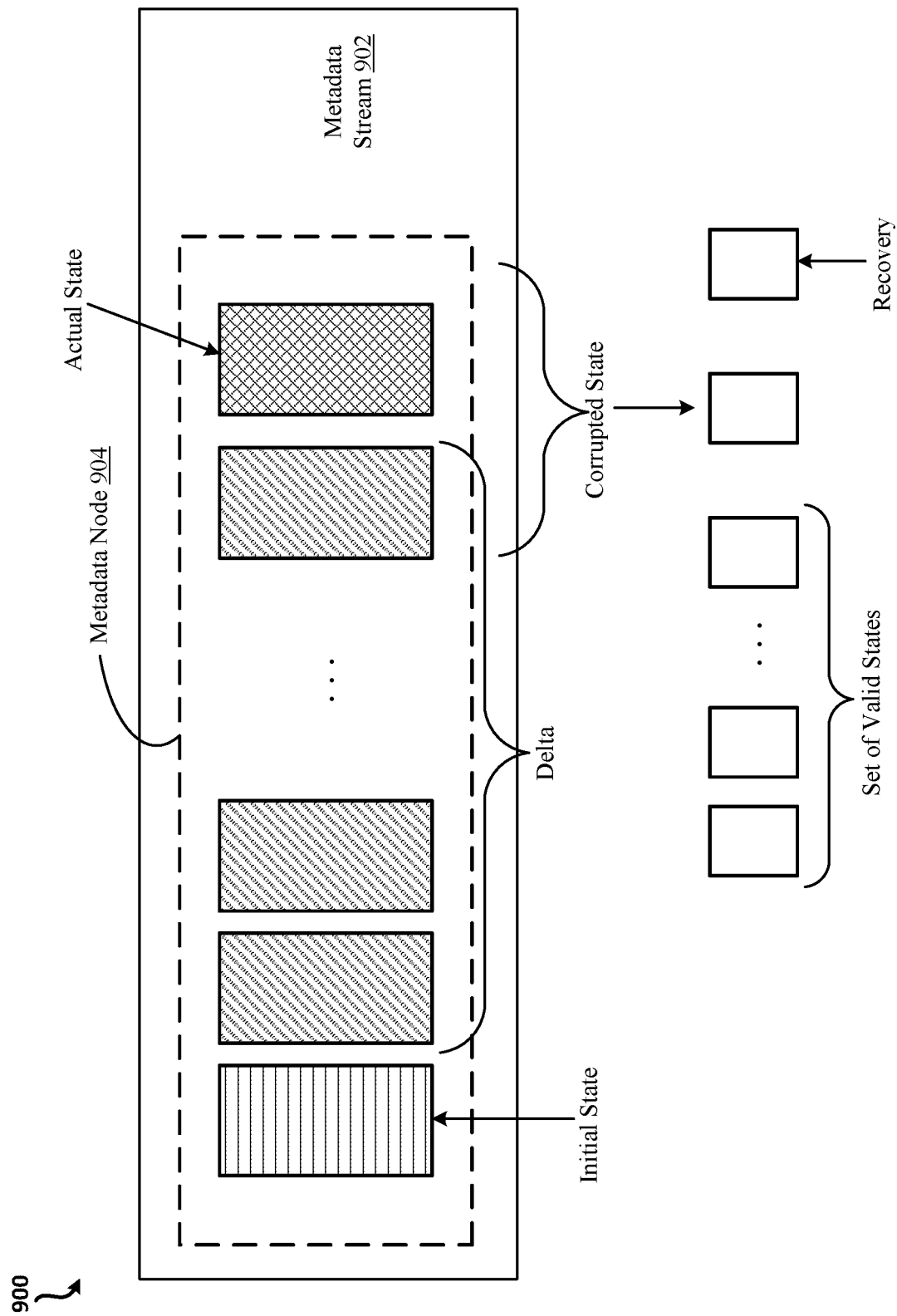
FIG. 9 illustrates an exemplary recovering logic in accordance with the present disclosure.

FIG. 9 shows a recovering logic 900. If a metadata node 904 in a metadata stream 902 is corrupted, the actual state and the latest delta associated with the metadata node 904 may represent the corrupted state. The initial state of the metadata node and all other deltas may be consistent and valid. The initial state and the other deltas may be used to recover the consistent state. The initial state and the other deltas may be used to rollback to the previous consistent metadata state if the recovery logic fails. The available deltas may be used to prepare a set of valid states of the metadata node 904. These valid states of the metadata node 904 may be compared with each other and with the corrupted state. Such comparison may be used to detect valid metadata items and corrupted ones. The recovering logic may prepare a consistent state of the metadata node 904 by merging valid items and recovering corrupted ones. The recovered metadata node may be checked by the checking logic. If the recovered metadata node is valid, then the actual state and the latest delta may be updated, and metadata node may be available in the regular write mode. If the recovered metadata node is not valid, the metadata node may be available only in read-only mode and the storage device may need to issue an error for every update/write request that attempts to access that particular metadata node.

The storage device 210 may not be able to solve all metadata corruptions. In some instances, the checking and recovering logic on the storage device side may not be enough to solve metadata corruptions. If the storage device 210 is not be able to solve all metadata corruptions, the file system driver 205 and/or the FSCK 104 may check the consistency of the file system volume and may interact with the checking and recovery logic on the storage device side.

Figure 10:
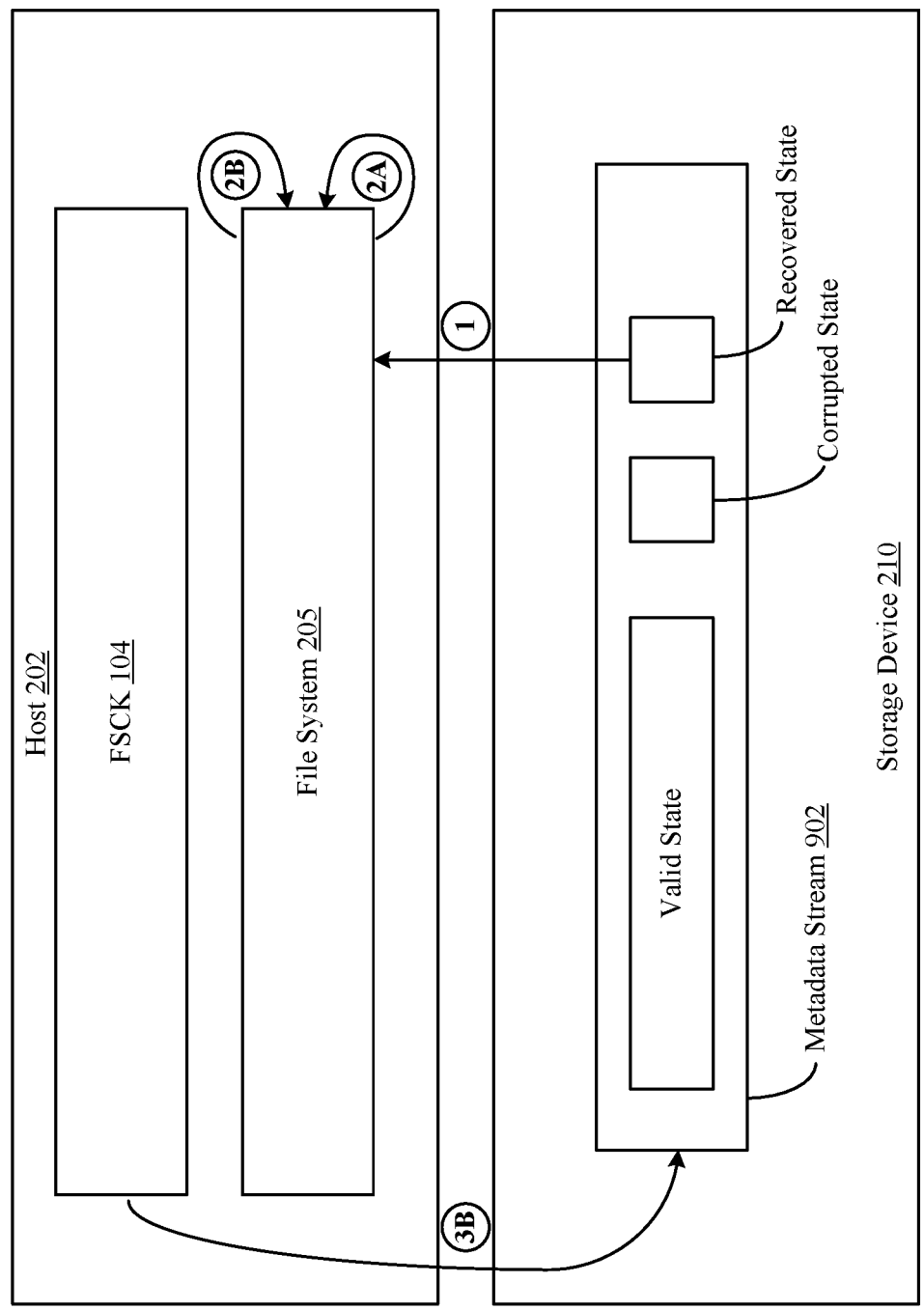
FIG. 10 illustrates an exemplary system for file system check and/or file system driver interaction with recovery logic on the storage device side in accordance with the present disclosure.

FIG. 10 shows a system 1000 for FSCK and/or file system driver interaction with the recovery logic on the storage device side. The storage device 210 may check and recover any found corruptions. The recovered metadata may become available for the file system driver 205 at numeral 1. At numeral 2A, it may be determined by the file system driver 205 if an error exists. If the file system driver 205 does not detect any error of the recovered metadata, the recovered metadata may be continued to be used at numeral 2B. If the file system driver 205 detects any error of the metadata, the FSCK 104 may be used to fix the error to recover the metadata. If it is impossible to recover the metadata even by the FSCK 104, the storage device 210 can be instructed by the FSCK tool for rollbacking to a previous valid state of the metadata at numeral 3.

In accordance with the present disclosure, the corrupted state of metadata may be detected directly at the time of the corruption event. This may significantly improve the reliability of data storage technologies. Further, the storage device 210 may be able to check the consistency of metadata (and/or user data) after each update operation. Thus, the storage device 210 may be able to recover a metadata state on the fly without any intervention from the file system driver 205 or from the FSCK 104. Even if the metadata is completely unrecoverable, the storage device 210 may be able to recover a consistent state of the metadata by rollbacking to an available previous consistent state of the metadata. The techniques described herein provides a way to check and recover a metadata (and/or user data) state on the fly without requiring services to be offline. The techniques described herein save time during data and metadata corruption processing and decrease the total cost. Additionally, the storage device (e.g., the storage device 210) may use machine learning techniques to learn how to fix the corrupted metadata. As every stream has multiple deltas, each stream represents a sequence of metadata node modifications. The storage device 210 may use this sequence of node modifications to learn the rules of modification. The rules may be used to elaborate the checking and recovery logic. In embodiments, the storage device 210 may be able to build a checking and recovery logic even without algorithms provided by developers.

FIG. 11 illustrates an example process 1100. The process 1100 may be performed, at least in part, by one or more components of the framework 100. The process 1100 may be performed to implement instant corruption detection and recovery. Although depicted as a sequence of operations in FIG. 11, those of ordinary skill in the art will appreciate that various embodiments may add, remove, reorder, or modify the depicted operations.

At 1102, a plurality of streams may be created. The plurality of streams may be created in a storage device (e.g., storage device 210). Each of the plurality of streams may be associated with a metadata structure. Each of the plurality of streams may be configured to contain a sequence of metadata nodes or portions of particular granularity (e.g., 8 KB). The metadata nodes contained by a particular stream may be of a same type among a plurality of metadata types. A file system driver may update the metadata on the basis of defined granularity. The granularity may be 8K, 16K, or any other granularity. The metadata may be partially updated (4K, for example), then the file system driver may send an update only for the 4K portion of the whole granularity. The LBA address may identify which portion of 8K or 16K needs to be updated in persistent memory/media.

Each of the plurality of streams may be configured to maintain an initial state, a sequence of delta modifications to the initial state, and an actual state for each of the sequence of metadata nodes. The initial state area of each of the plurality of streams may store a consistent metadata state associated with a particular timepoint in the past. The delta area of the each of the plurality of streams may store delta-encoded states of the metadata node for some number of timepoints in the past. The actual state area of each of the plurality of streams may store the latest state of the metadata node. If the actual state becomes corrupted, then the delta area and the initial state area may be used to recover a consistent state of the metadata or to rollback a previous consistent state if the metadata cannot be recovered.

The storage device may check metadata modification operation(s) to instantly detect corruption. Checking every operation may be expensive from a performance point of view. Thus, a user may specify whether every operation should be checked, or whether a subset of modification operations should be checked. The checking operation may occur when the storage device is idle, for example. A checking and recovery logic or function configured to check modification operation(s) of a particular metadata structure and perform recovery may be determined and registered. At 1104, a checking and recovery function may be determined. The checking and recovery function may be determined by a developer and/or by a machine learning model. As described above, the storage device may use machine learning techniques to learn how to detect and fix corrupted metadata. As every stream has multiple deltas, each stream represents a sequence of metadata node modifications. The storage device may use this sequence of node modifications to learn the rules of modification. The rules may be used to elaborate the checking/recovery logic. In embodiments, the storage device may be able to build checking and recovery logic using a machine learning model when no algorithm is provided by a developer.

The checking and recovery function may be associated with a particular stream among the plurality of streams. The checking and recovery function may comprise checking logic. The checking logic may be configured to detect corruption(s). To detect corruption(s), the checking logic may check modification operations associated with metadata nodes in the particular stream. The checking and recovery function may further comprise recovery logic. The recovery logic may be configured to perform a recovery from the corruption(s).

A host may comprise a file system tool and/or a file system driver. The file system tool and/or the file system driver may register the checking and recovery function(s) for every metadata structure. At 1106, the checking and recovery function associated with the particular stream may be implemented in the storage device. The storage device may be associated with at least one computational core. The logic of the checking and recovery function may be implemented as FPGA logic by a FPGA core. Alternatively, the logic may be regular executable code that is configured to be executed by a general-purpose ARM or RISC-V core. Alternatively, the logic may comprise an eBPF function. The storage device may execute checking logic for every modification operation. However, the checking of every operation may be expensive from a performance point of view. Thus, a user may specify whether every operation should be checked, or whether a subset of modification operations should be checked. The checking operation may occur when the storage device is idle, for example. The storage device may be manufactured with the support of some checking primitives that may be used by an application with the goal to associate the checking logic with a particular metadata stream.

FIG. 12 illustrates an example process 1200. The process 1200 may be performed, at least in part, by one or more components of the framework 100. The process 1200 may be performed to implement instant corruption detection and recovery. Although depicted as a sequence of operations in FIG. 12, those of ordinary skill in the art will appreciate that various embodiments may add, remove, reorder, or modify the depicted operations.

At 1202, a plurality of streams may be created. The plurality of streams may be created in a storage device (e.g., storage device 210). Each of the plurality of streams may be associated with a metadata structure. Each of the plurality of streams may be configured to contain a sequence of metadata nodes or portions of particular granularity (e.g., 8 KB). The metadata nodes contained by a particular stream may be of a same type among a plurality of metadata types. A file system driver may update the metadata on the basis of defined granularity. The granularity may be 8K, 16K, or any other granularity. The metadata may be partially updated (4K, for example), then the file system driver may send an update only for the 4K portion of the whole granularity. The LBA address may identify which portion of 8K or 16K needs to be updated in persistent memory/media.

Each of the plurality of streams may be configured to maintain an initial state, a sequence of delta modifications to the initial state, and an actual state for each of the sequence of metadata nodes. The initial state area of each of the plurality of streams may store a consistent metadata state associated with a particular timepoint in the past. The delta area of the each of the plurality of streams may store delta-encoded states of the metadata node for some number of timepoints in the past. The actual state area of each of the plurality of streams may store the latest state of the metadata node. If the actual state becomes corrupted, then the delta area and the initial state area may be used to recover a consistent state of the metadata or to rollback a previous consistent state if the metadata cannot be recovered.

The storage device may check metadata modification operation(s) to instantly detect corruption. Checking of every operation may be expensive from a performance point of view. Thus, a user may specify whether every operation should be checked, or whether some subsets of modification operations should be checked. The checking operation may occur when the storage device is idle, for example. A checking and recovery logic/function configured to check modification operation(s) of a particular metadata structure and perform recovery may be determined and registered. At 1204, a plurality of checking and recovery functions may be determined. The checking and recovery function may be determined by a developer and/or using a machine learning model. As described above, the storage device may use machine learning technique(s) to learn how to detect and fix the corrupted metadata. As every stream has multiple deltas, each stream represents a sequence of metadata node modifications. The storage device may use this sequence to learn the rules of modification. The rules may be used to elaborate the checking/recovery logic. In embodiments, the storage device may be able to build checking/recovery logic using a machine learning model even if algorithms are not provided by developers.

The plurality of checking and recovery functions may be associated with the plurality of streams. Each of the plurality of checking and recovery functions may correspond to a particular stream among the plurality of streams. Each of the plurality of checking and recovery functions may comprise checking logic. The checking logic may be configured to detect corruption(s). To detect corruption(s), the checking logic may check modification operations associated with metadata nodes in the particular stream. Each of the plurality of checking and recovery functions may further comprise recovery logic. The recovery logic may be configured to perform a recovery from the corruption(s).

In embodiments, the storage device may need not only to check the metadata structure independently, but also to check the consistency of all metadata structures as a whole. Different metadata structures may depend on each other or have relations with each other. Thus, corruption may cause issues with multiple metadata structures. An application or file system driver may define or register not only the functions for checking a particular metadata structure, but also checking functions that are configured to check relations of metadata items among two or more metadata structures. At 1206, functions configured to check relations of metadata nodes in two or more streams may be determined (e.g., defined). The two or more streams may be among the plurality of streams. At 1208, consistency of the plurality of metadata types may be maintained. The consistency of the plurality of metadata types may be maintained by implementing the checking functions computation of which may be offloaded into the storage device. The storage device may be associated with at least one computational core. The storage device may execute the checking function of any particular metadata structure. The storage device may also execute all checking functions for associated metadata structures in the persistent memory. The execution of the sequence of checking functions may allow the storage device to check and guarantee the consistency of the file system metadata as a whole.

FIG. 13 illustrates an example process 1300. The process 1300 may be performed, at least in part, by one or more components of the framework 100. The process 1300 may be performed to implement instant corruption detection and recovery. Although depicted as a sequence of operations in FIG. 13, those of ordinary skill in the art will appreciate that various embodiments may add, remove, reorder, or modify the depicted operations.

A plurality of streams may be created in a storage device (e.g., storage device 210). Each of the plurality of streams may be associated with a metadata structure. Each of the plurality of streams may be configured to contain a sequence of metadata nodes or portions of particular granularity (e.g., 8 KB). The metadata nodes contained by a particular stream may be of a same type among a plurality of metadata types. Each stream may be associated with a particular LBA range. As described above, each stream may be associated with a particular LBA range using either a flexible model or a fixed range model. If a stream is associated with an LBA range using the flexible model, an I/O request may identify which LBAs should be added into the stream. The storage device may store a mapping table that associates LBAs with stream IDs. It may not be possible to check whether the requested LBA for a particular stream ID is valid or not. If a stream is associated with an LBA range using the fixed range model, the storage device may support the operation of LBA range reservation for a particular stream ID. It may be checked whether the requested LBA for a particular stream ID is valid or not.

The storage device may support the stream concept by managing special mapping table that associates stream identifiers (IDs) with particular LBAs. At 1302, a mapping table may be managed. The mapping table may be managed by a storage device. The mapping table may be configured to associate a stream ID of a particular stream among the plurality of streams with a particular range of LBAs allocated for the particular stream.

Different types of metadata may be stored into different streams based on stream IDs identified in metadata I/O requests. At 1304, an I/O request may be received. The I/O request may comprise a request for updating at least one metadata node in the particular stream. The I/O request may comprise the stream ID of the particular stream and LBAs. The I/O request may contain a stream ID, an offset, and a number of LBAs to identify the metadata area for modification or access. Alternatively, the I/O request may contain a LBA range and a stream ID to identify the metadata area for modification or access. If a stream is associated with an LBA range using a fixed range model and it is determined that an I/O request contains a LBA range and a stream ID, the storage device may check the correctness of the I/O request. At 1306, it may be checked whether at least a subset of the LBAs in the I/O request is incorrect for the particular stream. This check performed by the storage device 210 may detect and prevent corruption in the early stages of corruption. At 1308, the I/O request may be discarded. The I/O request may be discarded in response to identifying an incorrectness of the LBAs in the I/O request. The I/O request may be discarded to prevent corruption(s).

Figure 14:
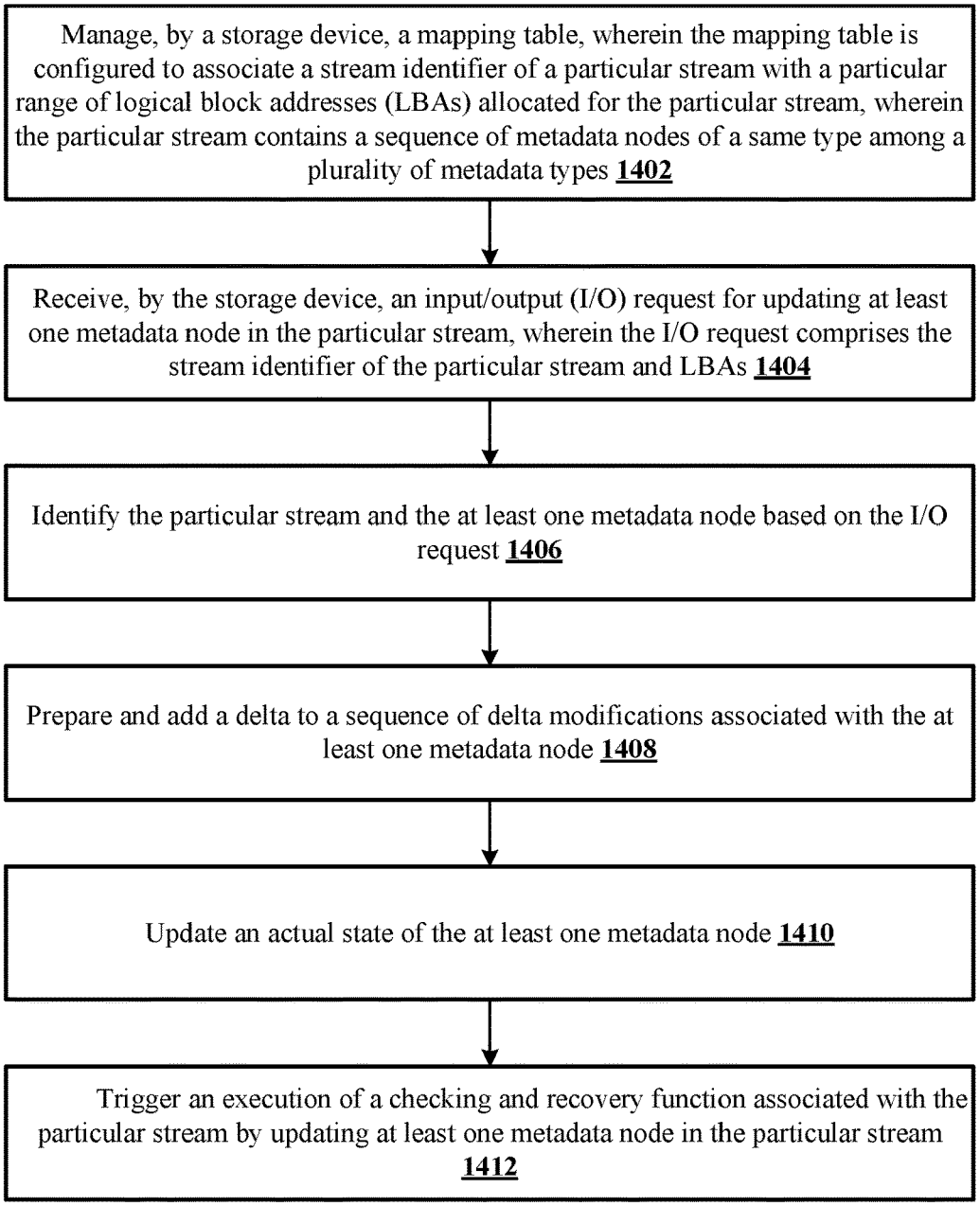
FIG. 14 illustrates another example process for implementing instant corruption detection and recovery in accordance with the present disclosure.

FIG. 14 illustrates an example process 1400. The process 1400 may be performed, at least in part, by one or more components of the framework 100. The process 1400 may be performed to implement instant corruption detection and recovery. Although depicted as a sequence of operations in FIG. 14, those of ordinary skill in the art will appreciate that various embodiments may add, remove, reorder, or modify the depicted operations.

A plurality of streams may be created in a storage device (e.g., storage device 210). Each of the plurality of streams may be associated with a metadata structure. Each of the plurality of streams may be configured to contain a sequence of metadata nodes or portions of particular granularity (e.g., 8 KB). The metadata nodes contained by a particular stream may be of a same type among a plurality of metadata types. Each stream may be associated with a particular LBA range. The storage device may support the stream concept by managing special mapping table that associates stream identifiers (IDs) with particular LBAs. At 1402, a mapping table may be managed. The mapping table may be managed by a storage device. The mapping table may be configured to associate a stream ID of a particular stream among the plurality of streams with a particular range of LBAs allocated for the particular stream.

Different types of metadata may be stored into different streams. At 1404, an I/O request may be received. The I/O request may comprise a request for updating at least one metadata node in a particular stream. The I/O request may comprise the stream ID of the particular stream and LBAs. The I/O request may contain a stream ID, an offset, and a number of LBAs to identify the metadata area for modification or access. Alternatively, the I/O request may contain a LBA range and a stream ID to identify the metadata area for modification or access. At 1406, the particular stream may be identified. The particular stream may be identified based on the I/O request. The at least one metadata node may be identified. The at least one metadata node may be identified based on the I/O request.

At 1408, a delta may be prepared. The delta may be a delta between the updated and the initial state of the metadata. The delta may be prepared using any suitable delta-encoding technique. The prepared delta may be stored into (e.g., added into) the delta area of the stream. Then, the storage device may update the actual state of the metadata node. At 1410, an actual state of the at least one metadata node may be updated. The metadata node may be checked before the actual state is updated. Alternatively, the metadata node may be checked after the actual state is updated. The end of the operation that updates the actual state may trigger execution of the checking function associated with the stream. At 1412, an execution of a checking and recovery function may be triggered. The checking and recovery function may be associated with the particular stream. The execution of a checking and recovery function may be triggered by updating the at least one metadata node. The consistency of the updated metadata node may be checked based on executing the checking function.

Figure 15:
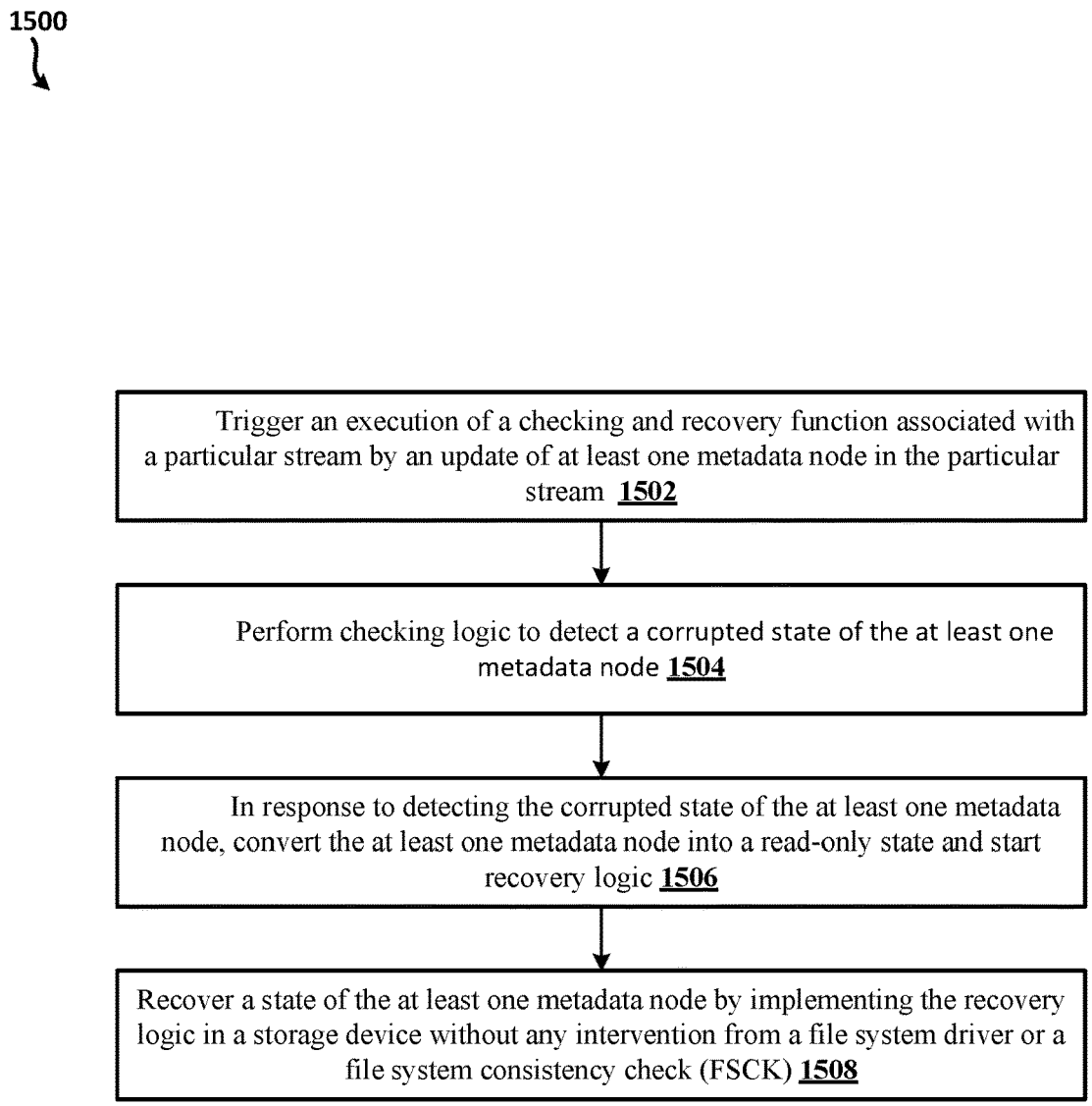
FIG. 15 illustrates another example process for implementing instant corruption detection and recovery in accordance with the present disclosure.

FIG. 15 illustrates an example process 1500. The process 1500 may be performed, at least in part, by one or more components of the framework 100. The process 1500 may be performed to implement instant corruption detection and recovery. Although depicted as a sequence of operations in FIG. 15, those of ordinary skill in the art will appreciate that various embodiments may add, remove, reorder, or modify the depicted operations.

An operation that updates a metadata node in a particular stream may trigger execution of a checking and recovery function associated with the particular stream. At 1502, an execution of a checking and recovery function may be triggered. The checking and recovery function may be associated with the particular stream. The execution of a checking and recovery function may be triggered by updating at least one metadata node. The consistency of the updated metadata node may be checked based on executing the checking function. At 1504, the checking logic may be performed. The checking logic may be performed to detect a corrupted state of the at least one metadata node.

If no corruption is detected, then the metadata node(s) may be continued to be used. Otherwise, if corruption is detected, at 1506, the at least one metadata node may be converted into a read-only state. The at least one metadata node may be converted into a read-only state in response to detecting the corrupted state of the at least one metadata node. The recovery logic may be started. The recovery logic may be started in response to detecting the corrupted state of the at least one metadata node. At 1508, a state of the at least one metadata node may be recovered. The state of the at least one metadata node may be recovered by implementing the recovery logic in the storage device without any intervention from a file system driver or from a file system consistency check.

FIG. 16 illustrates an example process 1600. The process 1600 may be performed, at least in part, by one or more components of the framework 100. The process 1600 may be performed to implement instant corruption detection and recovery. Although depicted as a sequence of operations in FIG. 16, those of ordinary skill in the art will appreciate that various embodiments may add, remove, reorder, or modify the depicted operations.

A storage device (e.g., storage device 210) may check and recover any found corruptions. The recovered metadata may become available for a file system driver and/or an FSCK. At 1602, it may be detected whether an error exists in the recovered state of the at least one metadata node. It may be detected whether an error exists in the recovered state of the at least one metadata node by the file system driver. If the file system driver does not detect any error of the recovered metadata, then the recovered metadata may be continued to be used. If the file system driver detects any error of the recovered metadata, then the FSCK may be used may be used to fix the error to recover the metadata. At 1604, the error may be fixed. The error may be fixed by the FSCK. The error may be fixed in response to detecting that the error exists.

Figure 17:
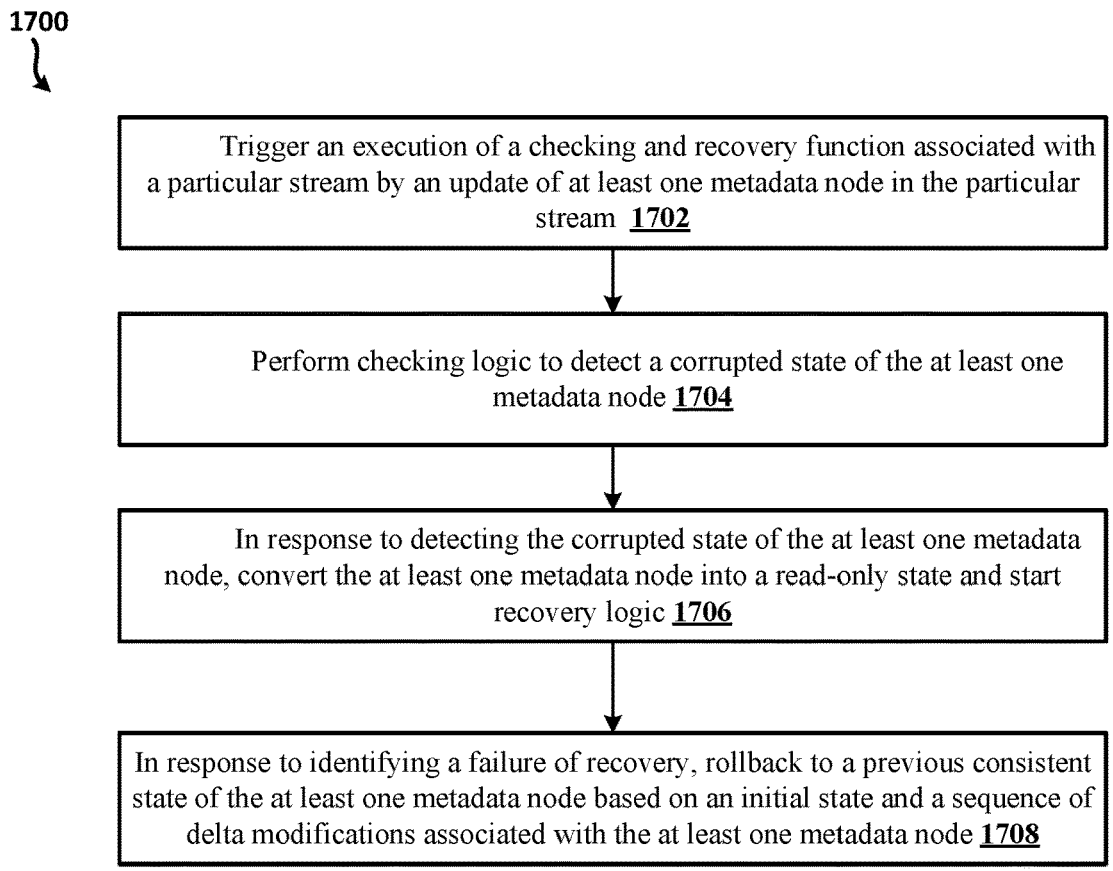
FIG. 17 illustrates another example process for implementing instant corruption detection and recovery in accordance with the present disclosure.

FIG. 17 illustrates an example process 1700. The process 1700 may be performed, at least in part, by one or more components of the framework 100. The process 1700 may be performed to implement instant corruption detection and recovery. Although depicted as a sequence of operations in FIG. 17, those of ordinary skill in the art will appreciate that various embodiments may add, remove, reorder, or modify the depicted operations.

An operation that updates the actual state of a metadata node in a particular stream may trigger execution of a checking and recovery function associated with the particular stream. At 1702, an execution of a checking and recovery function may be triggered. The checking and recovery function may be associated with the particular stream. The execution of a checking and recovery function may be triggered by updating at least one metadata node in the particular stream. The consistency of the updated metadata node may be checked based on executing the checking and recovery function. At 1704, the checking logic may be performed. The checking logic may be performed to detect a corrupted state of the at least one metadata node.

If no corruption is detected, then the metadata node may be continued to be used. Otherwise, if corruption is detected, at 1706, the metadata node may be converted into a read-only state. The metadata node may be converted into a read-only state in response to detecting a corruption of the at least one metadata node. The recovery logic may also be started. The recovery logic may be started in response to detecting the corrupted state of the at least one metadata node. The state of the at least one metadata node may be recovered by implementing the recovery logic in the storage device without any intervention from a file system driver or from a file system consistency check. At 1708, the storage device may rollback to a previous consistent state of the at least one metadata node. The storage device may rollback to the previous consistent state of the at least one metadata node in response to identifying a failure of recovery. The storage device may rollback to the previous consistent state of the at least one metadata node based on an initial state and a sequence of delta modifications associated with the at least one metadata node.

Figure 18:
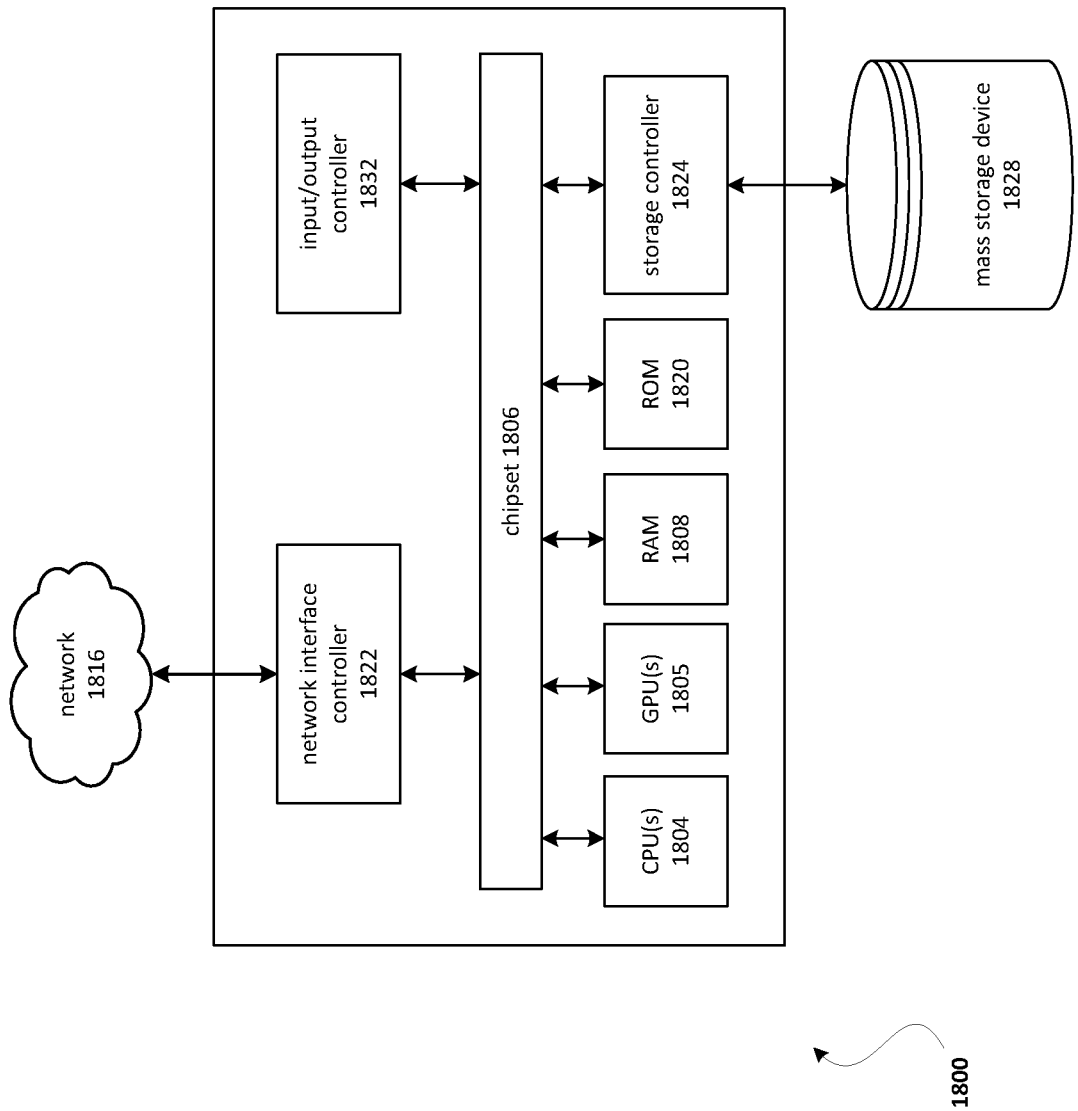
FIG. 18 illustrates an example computing device which may be used to perform any of the techniques disclosed herein.

FIG. 18 illustrates a computing device that may be used in various aspects, such as the services, networks, modules, and/or devices depicted in FIGS. 1-10. The computer architecture shown in FIG. 18 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1800 may include a baseboard, or "motherboard," which is a printed circuit board to which a multitude of components or devices may be connected by way of a system bus or other electrical communication paths. One or more central processing units (CPUs) 1804 may operate in conjunction with a chipset 1806. The CPU(s) 1804 may be standard programmable processors that perform arithmetic and logical operations necessary for the operation of the computing device 1800.

The CPU(s) 1804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1804 may be augmented with or replaced by other processing units, such as GPU(s) 1805. The GPU(s) 1805 may comprise processing units specialized for but not necessarily limited to highly parallel computations, such as graphics and other visualization-related processing.

A chipset 1806 may provide an interface between the CPU(s) 1804 and the remainder of the components and devices on the baseboard. The chipset 1806 may provide an interface to a random-access memory (RAM) 1808 used as the main memory in the computing device 1800. The chipset 1806 may further provide an interface to a computer-readable storage medium, such as a read-only memory (ROM) 1820 or non-volatile RAM (NVRAM) (not shown), for storing basic routines that may help to start up the computing device 1800 and to transfer information between the various components and devices. ROM 1820 or NVRAM may also store other software components necessary for the operation of the computing device 1800 in accordance with the aspects described herein.

The computing device 1800 may operate in a networked environment using logical connections to remote computing nodes and computer systems through local area network (LAN). The chipset 1806 may include functionality for providing network connectivity through a network interface controller (NIC) 1822, such as a gigabit Ethernet adapter. A NIC 1822 may be capable of connecting the computing device 1800 to other computing nodes over a network 1816. It should be appreciated that multiple NICs 1822 may be present in the computing device 1800, connecting the computing device to other types of networks and remote computer systems.

The computing device 1800 may be connected to a mass storage device 1828 that provides non-volatile storage for the computer. The mass storage device 1828 may store system programs, application programs, other program modules, and data, which have been described in greater detail herein. The mass storage device 1828 may be connected to the computing device 1800 through a storage controller 1824 connected to the chipset 1806. The mass storage device 1828 may consist of one or more physical storage units. The mass storage device 1828 may comprise a management component. A storage controller 1824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1800 may store data on the mass storage device 1828 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1828 is characterized as primary or secondary storage and the like.

For example, the computing device 1800 may store information to the mass storage device 1828 by issuing instructions through a storage controller 1824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1800 may further read information from the mass storage device 1828 by detecting the physical states or characteristics of one or more particular locations within the physical storage units.

In addition to the mass storage device 1828 described above, the computing device 1800 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1800.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1828 depicted in FIG. 18, may store an operating system utilized to control the operation of the computing device 1800. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1828 may store other system or application programs and data utilized by the computing device 1800.

The mass storage device 1828 or other computer-readable storage media may also be encoded with computer-executable instructions, which, when loaded into the computing device 1800, transforms the computing device from a general-purpose computing system into a special-purpose computer capable of implementing the aspects described herein. These computer-executable instructions transform the computing device 1800 by specifying how the CPU(s) 1804 transition between states, as described above. The computing device 1800 may have access to computer-readable storage media storing computer-executable instructions, which, when executed by the computing device 1800, may perform the methods described herein.

A computing device, such as the computing device 1800 depicted in FIG. 18, may also include an input/output controller 1832 for receiving and processing input from a number of input devices, such as a keyboard, a mouse, a touchpad, a touch screen, an electronic stylus, or other type of input device. Similarly, an input/output controller 1832 may provide output to a display, such as a computer monitor, a flat-panel display, a digital projector, a printer, a plotter, or other type of output device. It will be appreciated that the computing device 1800 may not include all of the components shown in FIG. 18, may include other components that are not explicitly shown in FIG. 18, or may utilize an architecture completely different than that shown in FIG. 18.

As described herein, a computing device may be a physical computing device, such as the computing device 1800 of FIG. 18. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate.

For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc.

Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of implementing instant corruption detection and recovery, comprising:
    creating a plurality of streams in a storage device, wherein each of the plurality of streams is configured to contain a sequence of metadata nodes of a same type among a plurality of metadata types, and wherein each of the plurality of streams comprises a first area that is configured to store an initial state associated with a particular timepoint in the past, a second area that is configured to store a sequence of delta modifications to the initial state, and a third area configured to store an actual state for each of the sequence of metadata nodes;
    determining a checking and recovery function among a plurality of checking and recovery functions corresponding to the plurality of streams, wherein the checking and recovery function is associated with a particular stream among the plurality of streams, wherein the checking and recovery function comprises checking logic configured to detect corruptions by checking modification operations associated with metadata nodes in the particular stream, and wherein the checking and recovery function further comprises recovery logic configured to perform recoveries from the corruptions using the initial state and the sequence of delta modifications to the initial state;
    implementing the checking and recovery function associated with the particular stream in the storage device, wherein the storage device is associated with at least one computational core;
    wherein the method further comprises:
    triggering an execution of the checking and recovery function associated with the particular stream by an update of at least one metadata node in the particular stream; and
    in response to detecting a corrupted state of the at least one metadata node, converting the at least one metadata node into a read-only state and starting the recovery logic.

2. The method of claim 1, further comprising:
    defining functions configured to check relations of metadata nodes in two or more streams, wherein the two or more streams are among the plurality of streams; and
    implementing the functions to maintain consistency of the plurality of metadata types.

3. The method of claim 1, further comprising:
    managing a mapping table, wherein the mapping table is configured to associate a stream identifier of the particular stream with a particular range of logical block addresses (LBAs) allocated for the particular stream.

4. The method of claim 3, further comprising:
    receiving, by the storage device, an input/output (I/O) request for updating at least one metadata node in the particular stream, wherein the I/O request comprises the stream identifier of the particular stream and LBAs.

5. The method of claim 4, further comprising:
    checking whether at least a subset of the LBAs in the I/O request is incorrect for the particular stream; and
    in response to identifying an incorrectness of the LBAs in the I/O request, discarding the I/O request to prevent a corruption.

6. The method of claim 4, further comprising:
    identifying the particular stream and the at least one metadata node based on the I/O request;
    adding a delta to a sequence of delta modifications associated with the at least one metadata node; and
    updating an actual state of the at least one metadata node.

7. The method of claim 1, further comprising:
    recovering a state of the at least one metadata node by implementing the recovery logic in the storage device without any intervention from a file system driver or a file system consistency check (FSCK).

8. The method of claim 7, further comprising:
    detecting whether an error exists in the recovered state of the at least one metadata node by the file system driver; and
    in response to detecting that the error exists, fixing the error by the FSCK.

9. The method of claim 1, further comprising:
    in response to identifying a failure of recovery, rollbacking to a previous consistent state of the at least one metadata node based on an initial state and a sequence of delta modifications associated with the at least one metadata node.

10. A system comprising:
    at least one processor; and
    at least one memory comprising computer-readable instructions that upon execution by the at least one processor cause the system to perform operations, the operations comprising:

creating a plurality of streams in a storage device, wherein each of the plurality of streams is configured to contain a sequence of metadata nodes of a same type among a plurality of metadata types, and wherein each of the plurality of streams comprises a first area that is configured to store an initial state associated with a particular timepoint in the past, a second area that is configured to store a sequence of delta modifications to the initial state, and a third area configured to store an actual state for each of the sequence of metadata nodes;

determining a checking and recovery function among a plurality of checking and recovery functions corresponding to the plurality of streams, wherein the checking and recovery function is associated with a particular stream among the plurality of streams, wherein the checking and recovery function comprises checking logic configured to detect corruptions by checking modification operations associated with metadata nodes in the particular stream, and wherein the checking and recovery function further comprises recovery logic configured to perform recoveries from the corruptions using the initial state and the sequence of delta modifications to the initial state;

implementing the checking and recovery function associated with the particular stream in the storage device, wherein the storage device is associated with at least one computational core;

wherein the operations further comprise:

triggering an execution of the checking and recovery function associated with the particular stream by an update of at least one metadata node in the particular stream; and in response to detecting a corrupted state of the at least one metadata node, converting the at least one metadata node into a read-only state and starting the recovery logic.

11. The system of claim 10, the operations further comprising:

managing a mapping table, wherein the mapping table is configured to associate a stream identifier of the particular stream with a particular range of logical block addresses (LBAs) allocated for the particular stream.

12. The system of claim 11, the operations further comprising:

receiving, by the storage device, an input/output (I/O) request for updating at least one metadata node in the particular stream, wherein the I/O request comprises the stream identifier of the particular stream and LBAs;

checking whether at least a subset of the LBAs in the I/O request is incorrect for the particular stream; and in response to identifying an incorrectness of the LBAs in the I/O request, discarding the I/O request to prevent a corruption.

13. The system of claim 11, the operations further comprising:

receiving, by the storage device, an input/output (I/O) request for updating at least one metadata node in the particular stream, wherein the I/O request comprises the stream identifier of the particular stream and LBAs;

identifying the particular stream and the at least one metadata node based on the I/O request;

adding a delta to a sequence of delta modifications associated with the at least one metadata node; and updating an actual state of the at least one metadata node.

14. A non-transitory computer-readable storage medium, storing computer-readable instructions that upon execution by a processor cause the processor to implement operations, the operations comprising:

creating a plurality of streams in a storage device, wherein each of the plurality of streams is configured to contain a sequence of metadata nodes of a same type among a plurality of metadata types, and wherein each of the plurality of streams comprises a first area that is configured to store an initial state associated with a particular timepoint in the past, a second area that is configured to store a sequence of delta modifications to the initial state, and a third area configured to store an actual state for each of the sequence of metadata nodes;

determining a checking and recovery function among a plurality of checking and recovery functions corresponding to the plurality of streams, wherein the checking and recovery function is associated with a particular stream among the plurality of streams, wherein the checking and recovery function comprises checking logic configured to detect corruptions by checking modification operations associated with metadata nodes in the particular stream, and wherein the checking and recovery function further comprises recovery logic configured to perform recoveries from the corruptions using the initial state and the sequence of delta modifications to the initial state;

implementing the checking and recovery function associated with the particular stream in the storage device, wherein the storage device is associated with at least one computational core;

wherein the operations further comprise:

triggering an execution of the checking and recovery function associated with the particular stream by an update of at least one metadata node in the particular stream; and in response to detecting a corrupted state of the at least one metadata node, converting the at least one metadata node into a read-only state and starting the recovery logic.

15. The non-transitory computer-readable storage medium of claim 14, the operations further comprising:

managing a mapping table, wherein the mapping table is configured to associate a stream identifier of the particular stream with a particular range of logical block addresses (LBAs) allocated for the particular stream.

16. The non-transitory computer-readable storage medium of claim 15, the operations further comprising:

receiving, by the storage device, an input/output (I/O) request for updating at least one metadata node in the particular stream, wherein the I/O request comprises the stream identifier of the particular stream and LBAs;

checking whether at least a subset of the LBAs in the I/O request is incorrect for the particular stream; and in response to identifying an incorrectness of the LBAs in the I/O request, discarding the I/O request to prevent a corruption.

17. The non-transitory computer-readable storage medium of claim 14, the operations further comprising:

recovering a state of the at least one metadata node by implementing the recovery logic in the storage device without any intervention from a file system driver or a file system consistency check (FSCK);

detecting whether an error exists in the recovered state of the at least one metadata node by the file system driver; and rollbacking to a previous consistent state of the at least one metadata node based on an initial state and a sequence of delta modifications associated with the at least one metadata node in response to determining a failure of recovery.

* * * * *